(12) United States Patent
Kubo

(10) Patent No.: US 8,902,467 B2
(45) Date of Patent: Dec. 2, 2014

(54) COLOR CONVERSION DEVICE DETERMINING VALUE OF NON-BASIC COLOR AND CONVERTING INPUT SIGNAL TO OUTPUT SIGNAL HAVING BASIC AND NON-BASIC COLORS AS ELEMENTS, COLOR CONVERSION METHOD IMAGE FORMING APPARATUS, AND NON-TRANSITORY COMPUTER READABLE MEDIUM

(75) Inventor: Masahiko Kubo, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 183 days.

(21) Appl. No.: 13/564,563

(22) Filed: Aug. 1, 2012

(65) Prior Publication Data
US 2013/0250317 A1 Sep. 26, 2013

(30) Foreign Application Priority Data

Mar. 26, 2012 (JP) .................. 2012-070344

(51) Int. Cl.
*G06K 1/00* (2006.01)
*G06K 9/00* (2006.01)
*B41J 2/21* (2006.01)

(52) U.S. Cl.
USPC ............ 358/1.9; 358/512; 382/167; 347/43

(58) Field of Classification Search
None
See application file for complete search history.

(56) References Cited

U.S. PATENT DOCUMENTS

| | | | | |
|---|---|---|---|---|
| 6,749,284 B2 * | 6/2004 | Nagoshi et al. | ................. | 347/43 |
| 6,796,629 B2 * | 9/2004 | Komatsu et al. | ................. | 347/15 |
| 7,097,268 B2 * | 8/2006 | Nagoshi | ......................... | 347/16 |
| 8,447,101 B2 * | 5/2013 | Murakami et al. | ............ | 382/163 |
| 2002/0054306 A1 * | 5/2002 | Iida et al. | ....................... | 358/1.9 |
| 2004/0114166 A1 | 6/2004 | Kubo | | |

FOREIGN PATENT DOCUMENTS

| | | |
|---|---|---|
| JP | 01-128836 A | 5/1989 |
| JP | 2004-194042 A | 7/2004 |

* cited by examiner

*Primary Examiner* — Steven Kau
(74) *Attorney, Agent, or Firm* — Sughrue Mion, PLLC

(57) ABSTRACT

A color conversion device includes a non-basic-color value determiner that determines a value of a non-basic color, to be used in an image forming unit, different from a basic color based on a maximum value for the non-basic color usable relative to an input basic-color value in an input image signal having the basic color as an element, a first non-basic-color limit rate and a second non-basic-color limit rate set relative to the input basic-color value and a total input basic-color value, respectively, and each indicating a rate that limits the use of the non-basic color relative to the maximum value; and a basic-color value determiner that determines a value of the basic color to be used in the image forming unit based on the determined non-basic-color value. The determiners convert the input image signal into an output image signal having the basic and non-basic colors as elements.

14 Claims, 9 Drawing Sheets

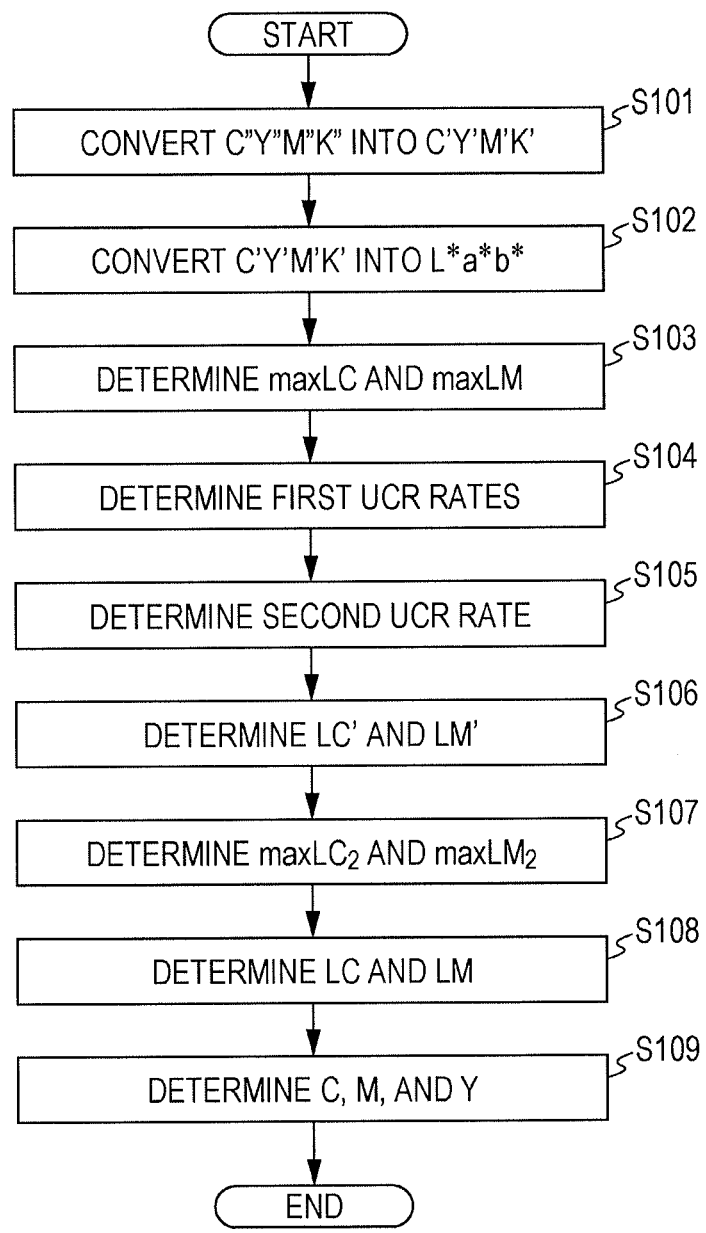

COLOR CONVERSION DEVICE DETERMINING VALUE OF NON-BASIC COLOR AND CONVERTING INPUT SIGNAL TO OUTPUT SIGNAL HAVING BASIC AND NON-BASIC COLORS AS ELEMENTS, COLOR CONVERSION METHOD IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-070344 filed Mar. 26, 2012.

BACKGROUND

(i) Technical Field

The present invention relates to color conversion devices, color conversion methods, image forming apparatuses, and non-transitory computer readable media.

SUMMARY

According to an aspect of the invention, there is provided a color conversion device including a non-basic-color value determiner and a basic-color value determiner. The non-basic-color value determiner determines a value of a non-basic color that is different from a basic color on the basis of a maximum non-basic-color value, a first non-basic-color limit rate, and a second non-basic-color limit rate. The value of the non-basic color is determined so as to be used in an image forming unit that forms an image by using a colorant of the basic color and a colorant of the non-basic color. The maximum non-basic-color value is a maximum value for the non-basic color that can be used relative to an input value of the basic color in an input image signal having the basic color as an element. The first non-basic-color limit rate is set relative to the input value of the basic color and indicates a rate that limits the use of the non-basic color relative to the maximum non-basic-color value. The second non-basic-color limit rate is set relative to a total input value of the basic color and indicates a rate that limits the use of the non-basic color relative to the maximum non-basic-color value. The basic-color value determiner determines a value of the basic color to be used in the image forming unit on the basis of the value of the non-basic color determined by the non-basic-color value determiner. The input image signal having the basic color as the element is converted into an output image signal having the basic color and the non-basic color as elements by using the non-basic-color value determiner and the basic-color value determiner.

BRIEF DESCRIPTION OF THE DRAWINGS

An exemplary embodiment of the present invention will be described in detail based on the following figures, wherein:

FIG. 9 is a flowchart illustrating the operation of the color conversion processor.

DETAILED DESCRIPTION

An exemplary embodiment of the present invention will be described in detail below with reference to the appended drawings.

Image Forming Apparatus

Figure 1:
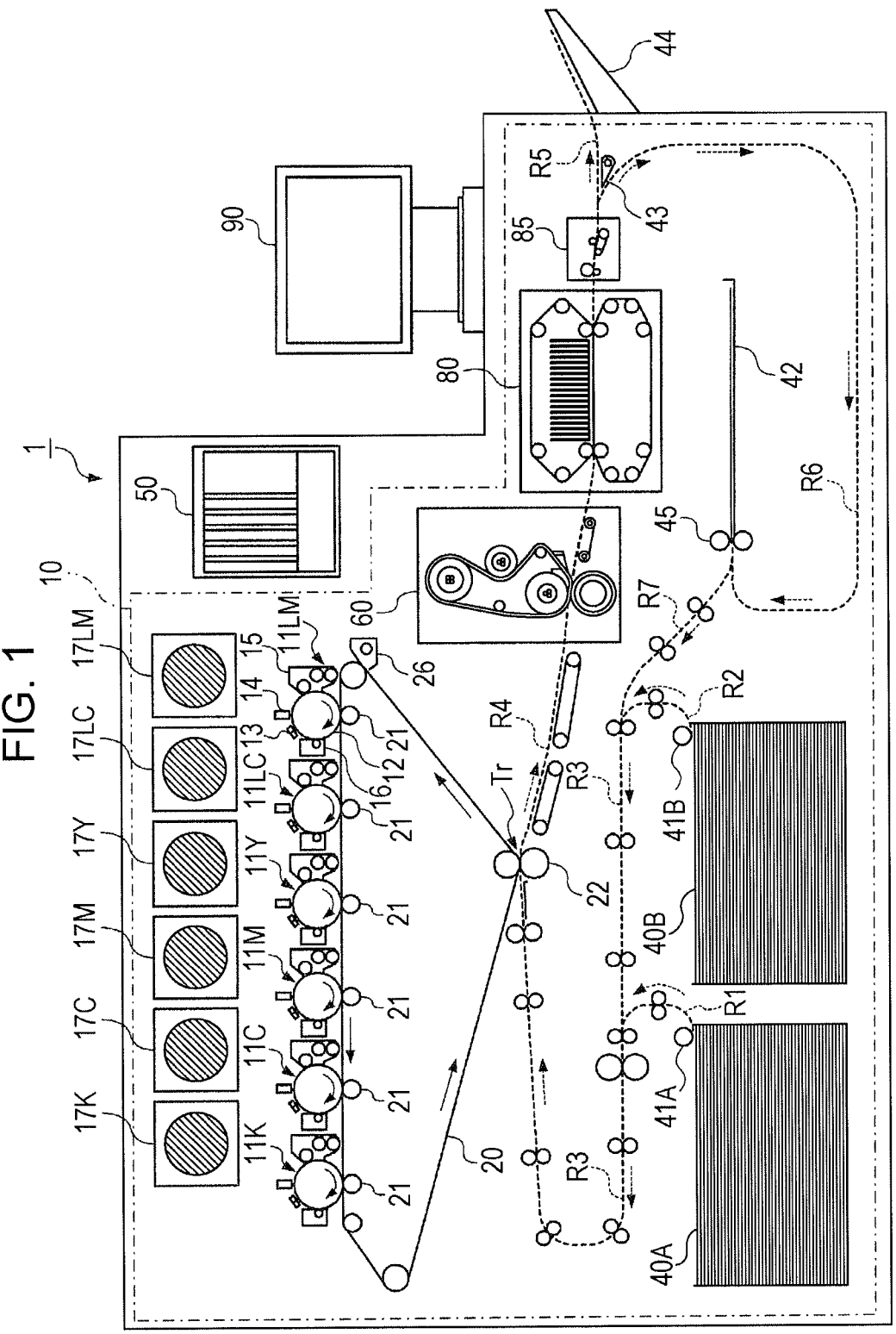
FIG. 1 illustrates a configuration example of an image forming apparatus to which the exemplary embodiment is applied.

FIG. 1 illustrates a configuration example of an image forming apparatus 1 to which the exemplary embodiment is applied.

The image forming apparatus 1 is a so-called tandem-type color printer and includes an image forming section 10 as an example of an image forming unit that performs an image forming process based on image data; a controller 50 that controls the operation of the entire image forming apparatus 1, communicates with, for example, a personal computer (PC), and performs image processing on the image data; and a user interface (UI) 90 that receives an input from a user and displays various kinds of information for the user.

Image Forming Section

The image forming section 10 is a functional section that forms an image based on, for example, an electrophotographic system, and includes six image forming units 11LM, 11LC, 11Y, 11M, 11C, and 11K (referred to as "image forming units 11" hereinafter) as an example of toner-image forming units arranged parallel to each other; an intermediate transfer belt 20 to which toner images of respective colors formed on photoconductor drums 12 in the image forming units 11 are transferred; and first-transfer rollers 21 that transfer (first-transfer) the toner images formed in the image forming units 11 onto the intermediate transfer belt 20. Furthermore, the image forming section 10 also includes a second-transfer roller 22 that collectively transfers (second-transfers) the toner images superposed and transferred on the intermediate transfer belt 20 onto a sheet, and a fixing unit 60 as an example of a fixing section (fixing device) that fixes the second-transferred toner images onto the sheet.

In addition, the image forming section 10 includes a cooling unit 80 as an example of a cooling section that cools the toner images fixed on the sheet by the fixing unit 60 so as to accelerate the fixation of the toner images onto the sheet, and a curl correcting unit 85 that corrects bending (curl) of the sheet.

In the image forming apparatus 1 according to this exemplary embodiment, the intermediate transfer belt 20, the first-transfer rollers 21, and the second-transfer roller 22 constitute a transfer unit. Moreover, an area where the second-transfer roller 22 is disposed and where the toner images on the intermediate transfer belt 20 are second-transferred onto the sheet will be referred to as "second-transfer area Tr" hereinafter.

Image Forming Units

Each image forming unit 11 has functional components including, for example, a photoconductor drum 12 on which an electrostatic latent image is formed and a toner image of the corresponding color is subsequently formed, a charger 13 that charges the surface of the photoconductor drum 12 with a predetermined electric potential, an exposure unit 14 that exposes the photoconductor drum 12 charged by the charger 13 to light on the basis of image data, a developing unit 15 that develops the electrostatic latent image formed on the photoconductor drum 12 by using a toner (colorant) of the corresponding color, and a cleaner 16 that cleans the surface of the photoconductor drum 12 after a transfer process.

The developing units 15 in the image forming units 11 are connected to toner containers 17LM, 17LC, 17Y, 17M, 17C, and 17K (referred to as "toner containers 17" hereinafter), which store toners of the respective colors, via toner transport paths (not shown). The toners are supplied to the respective developing units 15 from the toner containers 17 by supply screws (not shown) provided within the toner transport paths.

The image forming units 11 substantially have the same configuration except for the toners accommodated in the developing units 15, and are configured to form light magenta (LM), light cyan (LC), yellow (Y), magenta (M), cyan (C), and black (K) toner images. In this case, the LM color has a magenta-based color phase and is a magenta color with relatively lower concentration than the M color, and the LC color has a cyan-based color phase and is a cyan color with relatively lower concentration than the C color.

In this exemplary embodiment, the C color, the M color, the Y color, and the K color are set as basic colors that are normally used, whereas the LC color and the LM color are set as non-basic colors different from the basic colors. Furthermore, the LC color and the LM color are light colors with lower concentration than the C color and the M color, which are basic colors.

Sheet Transport System in Image Forming Apparatus

As a sheet transport system, the image forming section 10 includes multiple (two in this exemplary embodiment) sheet containers 40A and 40B that accommodate sheets therein; feed rollers 41A and 41B that feed and transport the sheets accommodated in the sheet containers 40A and 40B, respectively; a first transport path R1 that transports a sheet from the sheet container 40A; and a second transport path R2 that transports a sheet from the sheet container 40B. Moreover, the image forming section 10 includes a third transport path R3 that transports a sheet from each of the sheet container 40A and the sheet container 40B toward the second-transfer area Tr. In addition, the image forming section 10 includes a fourth transport path R4 that transports the sheet having toner images transferred thereon at the second-transfer area Tr so that the sheet travels through the fixing unit 60, the cooling unit 80, and the curl correcting unit 85, and a fifth transport path R5 that transports the sheet from the curl correcting unit 85 toward a sheet load portion 44 via an output portion of the image forming apparatus 1.

Transport rollers and transport belts are arranged from the first transport path R1 to the fifth transport path R5 so that fed sheets are sequentially transported.

Duplex-Printing Transport System

As a duplex-printing transport system, the image forming section 10 includes an intermediate sheet container 42 that temporarily keeps a sheet having toner images fixed to a first face thereof by the fixing unit 60; a sixth transport path R6 that transports the sheet from the curl correcting unit 85 toward the intermediate sheet container 42; and a seventh transport path R7 that transports the sheet accommodated in the intermediate sheet container 42 toward the aforementioned third transport path R3. Furthermore, the image forming section 10 includes a directing mechanism 43 that is disposed downstream of the curl correcting unit 85 in the sheet transport direction and that selectively directs the sheet to the fifth transport path R5, which transports the sheet toward the sheet load portion 44, or to the sixth transport path R6, which transports the sheet to the intermediate sheet container 42; and a feed roller 45 that feeds and transports the sheet accommodated in the intermediate sheet container 42 toward the seventh transport path R7.

Image Forming Process

Next, a basic image forming process performed in the image forming apparatus 1 according to this exemplary embodiment will be described with reference to FIG. 1.

The image forming units 11 in the image forming section 10 perform an electrophotographic process by using the aforementioned functional components so as to form LM, LC, Y, M, C, and K toner images. The toner images formed in the image forming units 11 are sequentially first-transferred and superposed onto the intermediate transfer belt 20 by the first-transfer rollers 21 so that a composite toner image is formed. The composite toner image on the intermediate transfer belt 20 is transported to the second-transfer area Tr, where the second-transfer roller 22 is disposed, as the intermediate transfer belt 20 moves (in a direction indicated by an arrow).

In the sheet transport system, the feed roller 41A or 41B starts rotating in accordance with the start timing of the image forming process in the image forming units 11 so that a sheet designated at, for example, the UI 90 is fed from one of the sheet container 40A and the sheet container 40B by the feed roller 41A or 41B. The sheet fed by the feed roller 41A or 41B is transported along the first transport path R1 or the second transport path R2, and then along the third transport path R3 so as to reach the second-transfer area Tr.

In the second-transfer area Tr, a transfer electric field generated by the second-transfer roller 22 causes the composite toner image on the intermediate transfer belt 20 to be collectively second-transferred onto the sheet.

Subsequently, the sheet having the composite toner image transferred thereon is separated from the intermediate transfer belt 20 and is transported toward the fixing unit 60 along the fourth transport path R4. The composite toner image on the sheet transported to the fixing unit 60 undergoes a fixing process by the fixing unit 60 so as to become fixed onto the sheet. Then, the sheet with the fixed image is cooled by the cooling unit 80 and undergoes a curl correction process by the curl correcting unit 85. Subsequently, in the case of simplex printing, the sheet passing through the curl correcting unit 85 is guided to the fifth transport path R5 by the directing mechanism 43 so as to be transported toward the sheet load portion 44.

The toner (first-transfer residual toner) adhered to the photoconductor drums 12 after the first-transfer process and the toner (second-transfer residual toner) adhered to the intermediate transfer belt 20 after the second-transfer process are respectively removed therefrom by the cleaners 16 and a belt cleaner 26.

In the case of duplex printing, the sheet with the fixed image formed on the first face thereof as the result of the above-described process travels through the curl correcting unit 85 and is guided to the sixth transport path R6 by the directing mechanism 43 so as to be transported toward the intermediate sheet container 42 along the sixth transport path R6. Then, the feed roller 45 starts rotating again in accordance with the start timing of a second-face image forming process by the image forming units 11 so that the sheet is fed from the intermediate sheet container 42. The sheet fed by the feed roller 45 is transported along the seventh transport path R7 and the third transport path R3 so as to reach the second-transfer area Tr.

Similar to the first-face printing process, a transfer electric field is generated by the second-transfer roller 22 in the second-transfer area Tr so that second-face toner images on the intermediate transfer belt 20 are collectively second-transferred onto the sheet.

Similar to the first-face printing process, the sheet having the toner images transferred to both faces thereof undergoes the fixing process by the fixing unit 60, the cooling process by the cooling unit 80, and then the curl correction process by the curl correcting unit 85. Subsequently, the sheet passing through the curl correcting unit 85 is guided to the fifth transport path R5 by the directing mechanism 43 so as to be transported toward the sheet load portion 44.

The image forming process is repeatedly performed in the image forming apparatus 1 in this manner for multiple cycles corresponding to the number of sheets to be printed.

Signal Processing System

Figure 2:
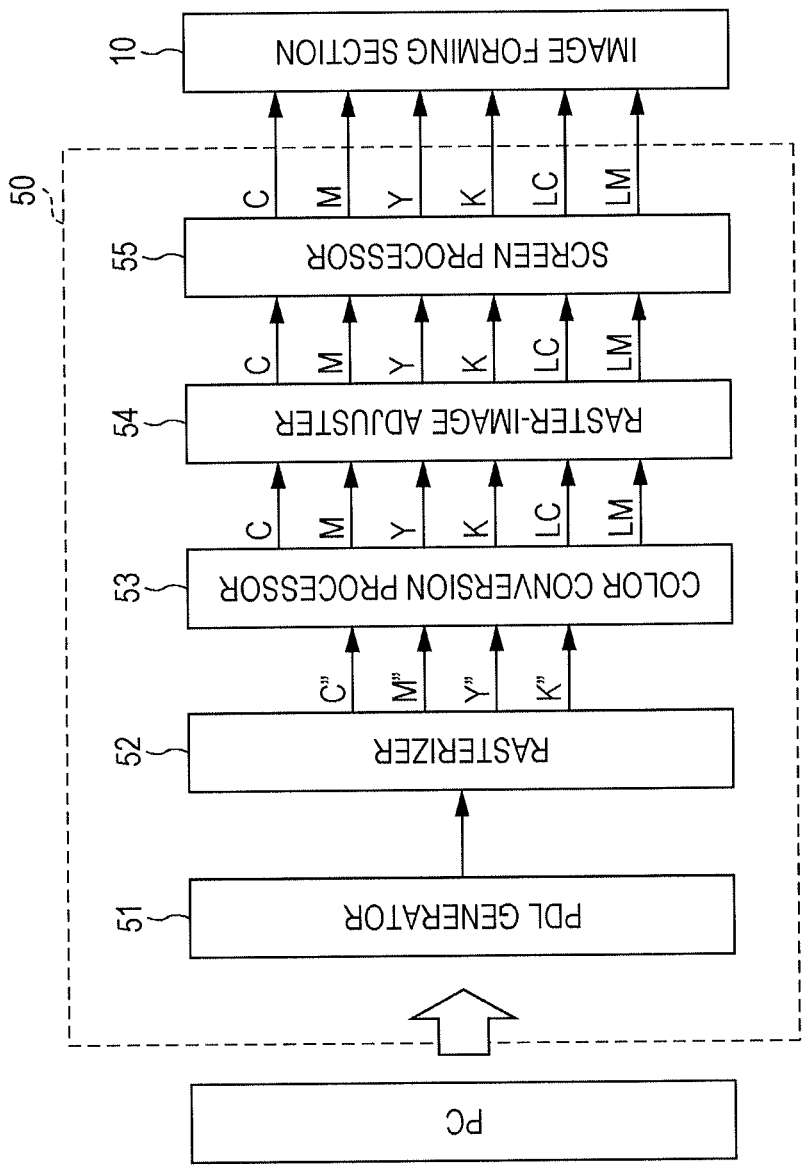
FIG. 2 is a block diagram illustrating a signal processing system as an image processor in a controller of the image forming apparatus.

FIG. 2 is a block diagram illustrating a signal processing system as an image processor in the controller 50 of the image forming apparatus 1.

In FIG. 2, the image forming section 10 that performs the image forming process on the basis of an image signal processed by a PC serving as an external device of the image forming apparatus 1 as well as by the signal processing system in the controller 50 is also shown together with the signal processing system. In this example, the image forming apparatus 1 is a printer. The flow of processing performed on the image signal will be described below with reference to FIG. 2.

The controller 50 includes a page-description-language (PDL) generator 51 that receives print data and converts it into PDL, a rasterizer 52 that generates a raster image from the PDL generated by the PDL generator 51, a color conversion processor 53 that converts CMYK data into CMYKLCLM data, a raster-image adjuster 54 that adjusts the raster image converted by the color conversion processor 53, and a screen processor 55 that performs screen processing.

In this exemplary embodiment, the PDL generator 51 first receives print data from the PC. This print data is image data that a user using the PC desires to print by using the image forming apparatus 1. The PDL generator 51 receiving the image data converts the image data into code data written in PDL and outputs the code data.

The rasterizer 52 converts the code data written in PDL output from the PDL generator 51 into raster data for each pixel so as to generate a raster image. Then, the rasterizer 52 outputs the converted raster data as C"M"Y"K" data, which are C, M, Y, and K color signals. In this case, the rasterizer 52 outputs CMYK data for each page. The rasterizer 52 may be constituted by using a raster image processor (RIP).

The color conversion processor 53 functions as a color conversion device, which will be described in detail later. The color conversion processor 53 converts the C"M"Y"K" data input from the rasterizer 52 into C'M'Y'K' data dependent on a color space in the image forming section 10, subsequently converts the C'M'Y'K' data into CMYKLCLM data, which are color signals of the colors (i.e., the C, M, Y, K, LC, and LM colors) to be reproduced by the image forming section 10, and then outputs the CMYKLCLM data. The CMYKLCLM data is constituted of C-color data, M-color data, Y-color data, K-color data, LC-color data, and LM-color data separated according to the respective colors.

The raster-image adjuster 54 performs various kinds of adjustments, such as Y-conversion, definition processing, and halftone processing, on the CMYKLCLM data input from the color conversion processor 53 so that a higher image quality may be achieved in the image forming section 10.

The screen processor 55 performs screen processing on image information by using a screen having an array of predetermined threshold values in the main scanning direction and the sub scanning direction. In this exemplary embodiment, the screen used is, for example, an amplitude modulation (AM) screen. Thus, a pseudo halftone may be expressed with binary image data in the image forming section 10.

Color Conversion Processor 53

Next, the color conversion processor 53, which is an example of a color conversion device according to this exemplary embodiment, will be described in further detail.

Figure 3:
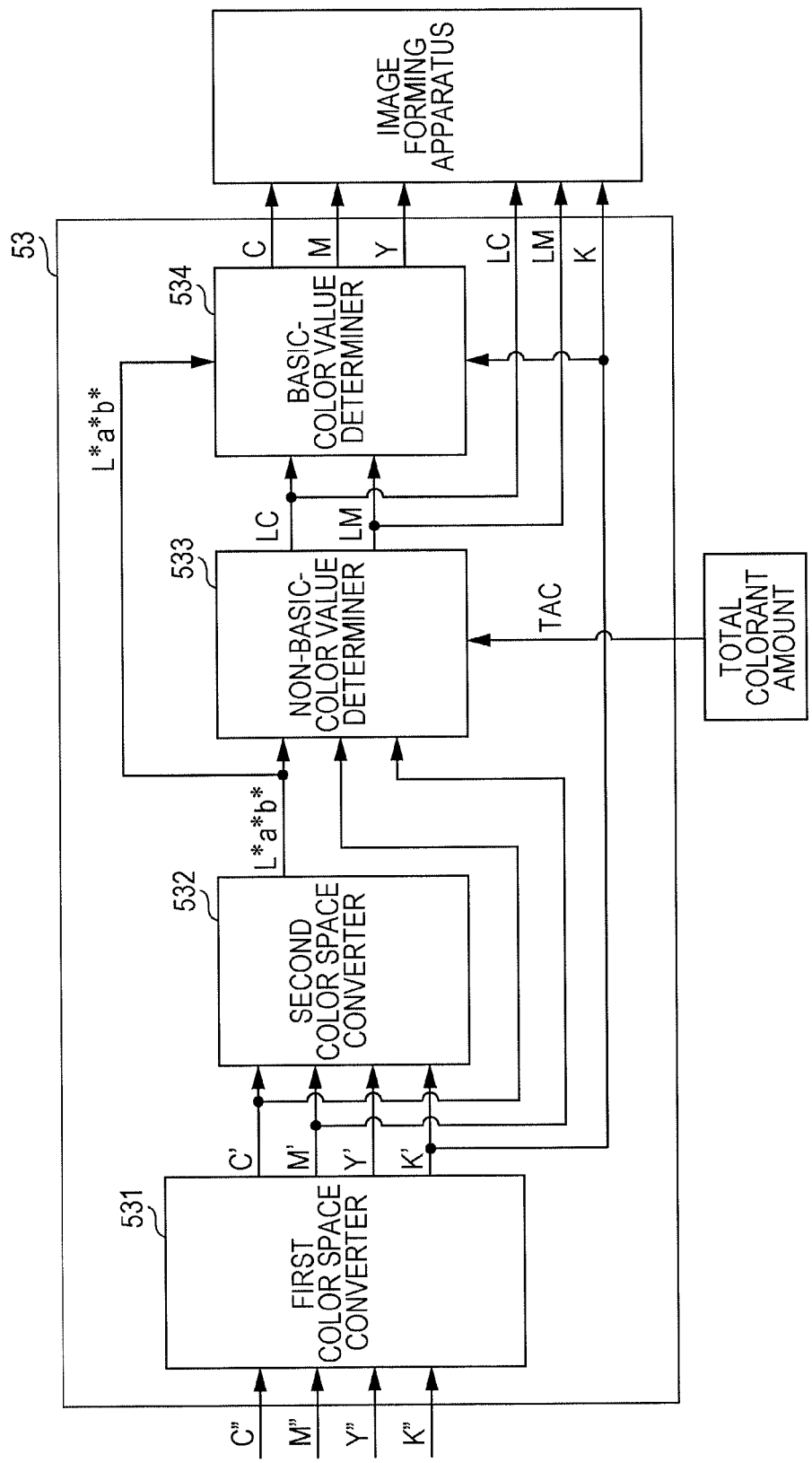
FIG. 3 illustrates a functional configuration example of a color conversion processor.

FIG. 3 illustrates a functional configuration example of the color conversion processor 53.

The color conversion processor 53 includes a first color space converter 531, a second color space converter 532, a non-basic-color value determiner 533, and a basic-color value determiner 534.

The first color space converter 531 converts the C"M"Y"K" data output from the rasterizer 52 into C'M'Y'K' data dependent on the color space in the image forming section 10. For example, the conversion is performed by using a look-up table (LUT), which is a multidimensional table. In this case, the LUT is a four-input four-output LUT.

The second color space converter 532 converts the C'M'Y'K' data converted by the first color space converter 531 into L*a*b* data, which is color data in an Lab color space.

Based on the L*a*b* data converted by the second color space converter 532, the non-basic-color value determiner 533 determines maximum non-basic-color values, which are maximum values for the non-basic colors that can be used relative to input values of the basic colors, within a predetermined color-difference range. Then, the non-basic-color value determiner 533 determines non-basic-color values on the basis of a first non-basic-color limit rate (first UCR rate) set relative to the input values of the basic colors and indicating a rate that limits the use of the non-basic colors relative to the maximum non-basic-color values, and a second non-basic-color limit rate (second UCR rate) set relative to a total input value of the basic colors and indicating a rate that limits the use of the non-basic colors relative to the maximum non-basic-color values.

Specifically, in this exemplary embodiment, maximum values to which the LC and LM colors, which are the non-basic colors, can be used are determined, and the maximum values are multiplied by the first UCR rate and the second UCR rate so that the values of the LC color and the LM color are determined.

The maximum non-basic-color values are each determined within a range lower than or equal to a total-amount limit value (total colorant amount), which is a total value of components of an output image signal (in this case, a total value of the C, M, Y, K, LC, and LM values). Since the C color can be reproduced without using the LC color, a minimum non-basic-color value for the LC color is 0. Likewise, since the M color can be reproduced without using the LM color, a minimum non-basic-color value for the LM color is 0.

Furthermore, the maximum non-basic-color values in this exemplary embodiment are determined by allowing a predetermined color difference without minimizing the color difference relative to L*a*b* color signals and then determining the maximum non-basic-color values within the allowable color-difference range. By allowing the predetermined color difference, the range of the non-basic-color values may be increased, as compared with a case where the color difference is minimized, whereby the maximum non-basic-color values may become larger. The larger the allowable color difference, the greater the degree of deviation of the reproduced color from the original color. Therefore, the allowable color difference may be set in view of a balance between the maximum non-basic-color values and the colors to be reproduced.

The first UCR rate may be set, for example, based on a function with respect to the L*a*b* color signals or a function according to the brightness, color saturation, or the like. However, in this exemplary embodiment, the first non-basic-color limit rate for the LC color, which is one of the non-basic colors, is set relative to the value of the C' color, which is one of the basic colors. This will be described in detail later. Moreover, the first non-basic-color limit rate for the LM color, which is the other non-basic color, is set relative to the value of the M' color, which is another one of the basic colors.

The second UCR rate is set relative to the total input value of the basic colors. This will be described in detail later. In this case, the total input value is a total value of C'M'Y'K' values expressed by C'+M'+Y'+K'.

The basic-color value determiner 534 determines basic-color values on the basis of the non-basic-color values determined by the non-basic-color value determiner 533. In this exemplary embodiment, the values of the C, M, Y, and K colors, which are the basic colors, are determined by using the L*a*b* values and the values of the LC color and the LM color, which are the non-basic colors, determined by the non-basic-color value determiner 533. A known method may be used for determining these values. For example, the input-output characteristics of the image forming section 10 may be formed into a model, and the values may be calculated by using the model. For example, if measurement values of colors to be output when (C, M, Y, Y, K, LC, LM) are given to the image forming section 10 are (L*, a*, b*), the relationship therebetween can be expressed by the following expression (1), assuming that the input-output characteristics of the image forming section 10 are expressed by a function f:

$$(L^*,a^*,b^*)=f(C,M,Y,K,LC,LM) \quad (1)$$

In the basic-color value determiner 534, the values of the C, M, and Y colors are determined from the LC, LM, and K colors by using the following expression (2), which is an inverse function of the above function:

$$(C,M,Y)=f^{-1}(L^*,a^*,b^*,K,LC,LM) \quad (2)$$

In the case where C, M, Y, Y, K, LC, LM are given, the function f is a function by which L*, a*, b* can be uniquely determined, and is obtained by using, for example, a neural network. The function f may be obtained on the basis of a measurement result obtained by preliminarily forming multiple color charts by using the image forming apparatus 1 and then measuring the L* value, the a* value, and the b* value in each color chart. These color charts are images of a combination of all of the C, M, Y, K, LC, and LM colors and are formed while varying the concentration in increments of, for example, 25% with respect to the image area (0%, 25%, 50%, 75%, and 100%). It is obvious that the function f may be of any kind so long as the relationship in expression (1) can be expressed and expression (2), which is an inverse function, can be obtained.

A method for determining maximum non-basic-color values and a method for setting first UCR rates will be described in further detail below.

Method for Determining Maximum Non-Basic-Color Values

In the non-basic-color value determiner 533, expression (2) is calculated while a given value of the K color is fixed, whereas the values of the LC color and the LM color are individually varied (namely, the other value is set to zero), under the condition in which the calculated value is smaller than or equal to a total value (total colorant amount TAC (total area coverage)=C+M+Y+K+LC+LM) of the values of the colors set for the image forming section 10. In this case, the preset color difference is allowed. The maximum values for the LC color and the LM color (maximum non-basic-color values: maxLC and maxLM) in which calculated values of CMY exist are determined within the range of this preset color difference. Minimum values for the LC color and the LM color (minimum non-basic-color values: minLC and minLM) in which the calculated values of CMY exist are zero.

Figure 4:
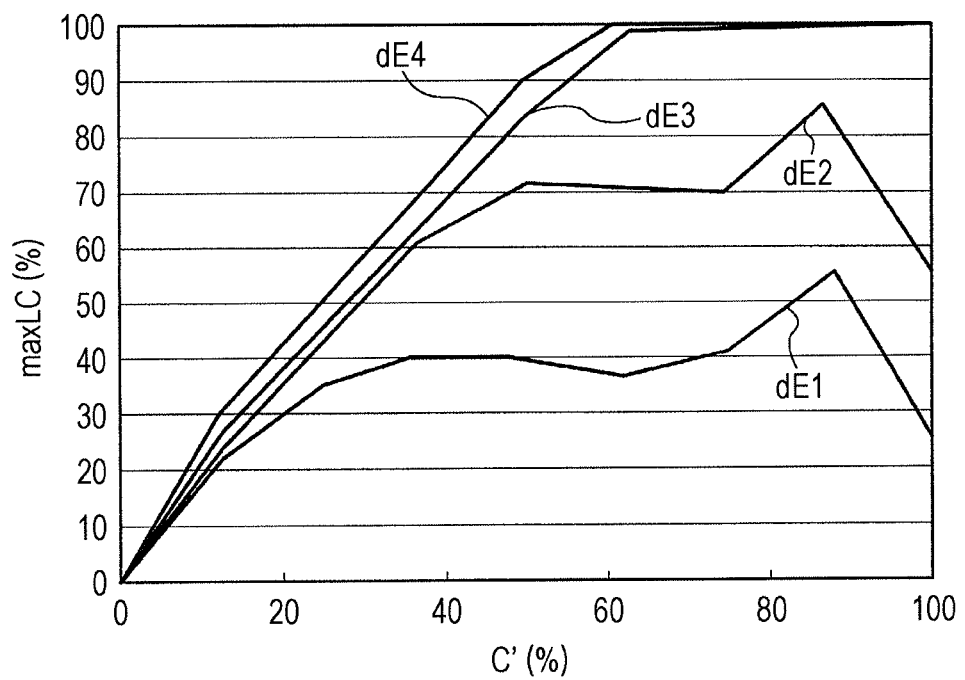
FIG. 4 illustrates the relationship between an allowable color difference and a maximum non-basic-color value.

FIG. 4 illustrates the relationship between an allowable color difference and a maximum non-basic-color value. FIG. 4 illustrates an example with respect to the C color and shows the relationship between a C'-color value and a maximum non-basic-color value maxLC. Reference characters dE1, dE2, dE3, and dE4 denote preset color differences, which have the relationship dE1<dE2<dE3<dE4. In the case of the preset color difference dE1, although the maximum non-basic-color value maxLC is smaller than that in other color differences, the maximum non-basic-color value maxLC increases with increasing allowable color difference. In the case of the preset color differences dE3 and dE4, the maximum non-basic-color value maxLC reaches 100%. Since the maximum non-basic-color value maxLC increases by increasing the allowable color difference in this manner, graininess may be improved as compared with a case where the allowable color difference is small. Furthermore, a change in the maximum non-basic-color value is less irregular, as compared with a case where the allowable color difference is small, whereby the gradation characteristics may be improved. However, since increasing the color difference leads to an increase in error in the color to be reproduced, the color difference may be set in view of both aspects.

Method for Setting First UCR Rates

The non-basic-color value determiner 533 further determines first UCR rates ($\alpha C$ and $\alpha M$) corresponding to C' and M' values by using functions $g_C$ and $g_M$ indicated in the following expression (3):

$$\alpha C = g_C(C')$$

$$\alpha M = g_M(M') \quad (3)$$

Then, LC' and LM' values are determined based on the following expression (4):

$$LC' = \text{max}LC \cdot \alpha C$$

$$LM' = \text{max}LM \cdot \alpha M \quad (4)$$

Specifically, the LC' and LM' values are not final LC and LM values, respectively, which will be described later.

Figure 5A:
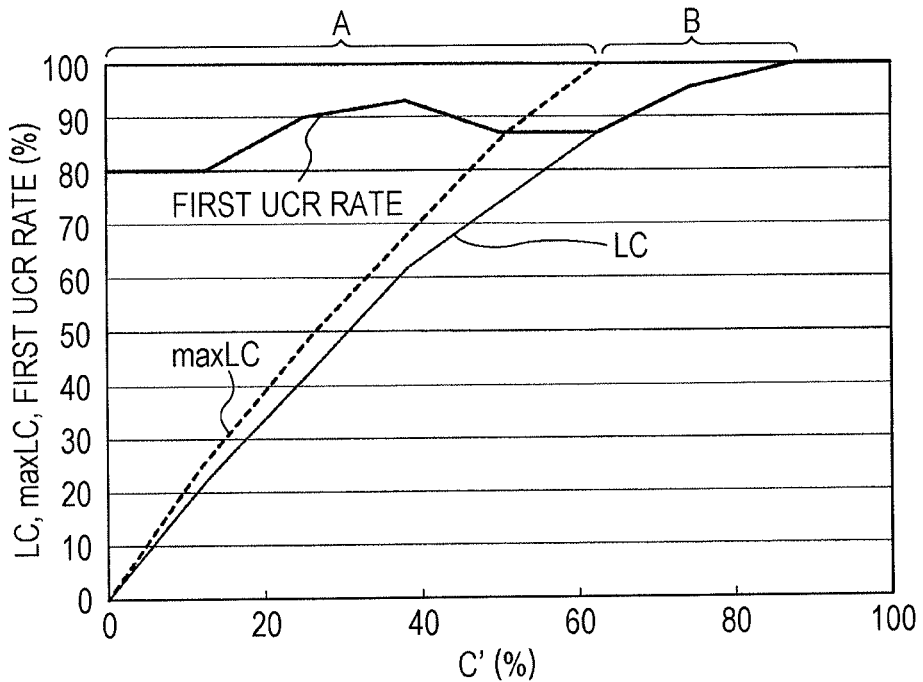
FIGS. 5A and 5B each illustrate the relationship between a first UCR rate and a non-basic-color value.
Figure 5B:
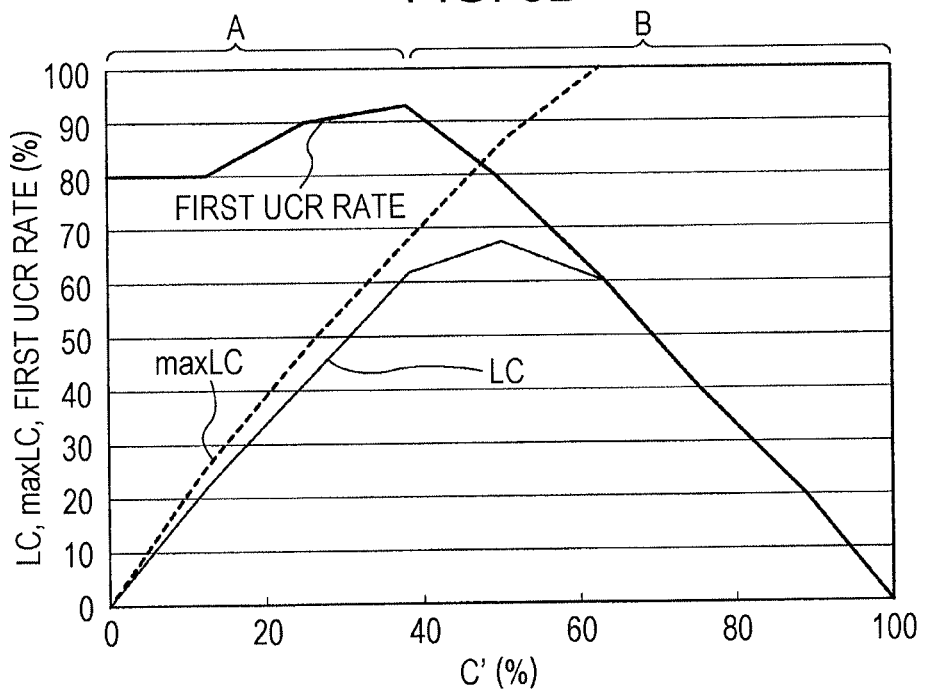

FIGS. 5A and 5B each illustrate the relationship between a first UCR rate and a non-basic-color value.

In each of the drawings, a dashed line indicates a maximum non-basic-color value, a thin line indicates an obtained non-basic color value, and a thick line indicates a first UCR rate. The maximum non-basic-color value and the non-basic-color value both range between 0% and 100%, and the first UCR rate also ranges between 0% and 100%, and they all share the vertical axis. The horizontal axis indicates a basic-color value. In this case, an example of the relationships a maxLC value, an LC-color value (i.e., the aforementioned LC' value), and a first UCR rate $\alpha C$ have with a value of the C' color, which is one of the basic colors, is shown.

In the example shown in FIG. 5A, the function $g_C$ for obtaining a first UCR rate is set such that the first UCR rate is 100% and the LC-color value is equal to the maximum non-basic-color value maxLC when the C'-color value is at maximum. Furthermore, in FIG. 5A, the UCR rate is suppressed in each of a region A and a region B. In the region A, when determining the maximum non-basic-color value maxLC, since the preset color difference is allowed, the LC-color value is also suppressed by suppressing the first UCR rate, thereby reducing an error in the color to be reproduced, as compared with a case where the LC-color value is equal to the maximum non-basic-color value maxLC. In the region B, since the maximum non-basic-color value maxLC changes from an increasing state to a constant value, this change is reduced, as compared with a case where the maximum non-basic-color value maxLC is used as the LC-color value. Consequently, the C color is gradually used by an amount by which the LC-color value is suppressed, thereby suppressing a rapid color change. Because the LC color, which is a lighter color, is used by a large amount in the example shown in FIG. 5A, this example may be used for setting a first UCR rate when placing importance on the image quality, such as graininess and gradation characteristics.

In the example shown in FIG. 5B, the function $g_C$ for obtaining a first UCR rate is set such that the first UCR rate is 0% and the LC-color value is at minimum (0% in this example) when the C'-color value is at maximum. In this example, the first UCR rate is also suppressed in each of the region A and the region B. In the region A, the above description with reference to FIG. 5A similarly applies. In the region B, the first UCR rate monotonously decreases with increasing C'-color value. Consequently, the value of the LC color, which is one of the non-basic colors, decreases as the value of the C' color, which is one of the basic colors, increases, and the C color is used by an amount by which the LC-color value decreases. For example, when the C'-color value is 100%, the LC-color value is 100% and the C-color value is also 100% in the example shown in FIG. 5A, so that the total value of the C color and the LC color is 200%. In contrast, in the example shown in FIG. 5B, the LC-color value is 0% and the C-color value is 100%, so that the total value of the C color and the LC color is 100%. Accordingly, in the example shown in FIG. 5B, the total value of colorants used is reduced as compared with the example shown in FIG. 5A. Thus, the example shown in FIG. 5B may be used for setting a first UCR rate when placing importance on the cost (colorant consumption).

A first UCR rate may be set based on alternative examples instead of the examples shown in FIGS. 5A and 5B. By adjusting the function for setting a first UCR rate, the non-basic-color value is controlled accordingly so that a non-basic-color value (and a basic-color value to be handled by the basic-color value determiner 534) corresponding to demands, such as the image quality and the cost, may be obtained.

Second UCR Rate

In the method for determining a non-basic-color value and a basic-color value only from a maximum non-basic-color value and a first UCR rate, as described above, problems may sometimes occur.

Figure 6:
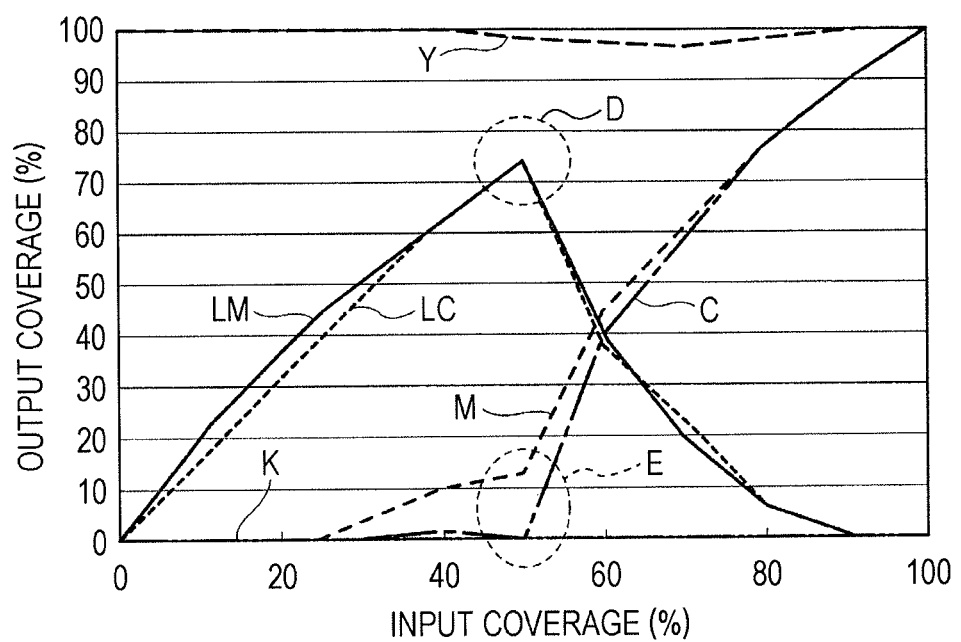
FIG. 6 illustrates a case where non-basic-color values and basic-color values are determined by using the first UCR rate shown in FIG. 5A.

FIG. 6 illustrates a case where non-basic-color values and basic-color values are determined by using the first UCR rate shown in FIG. 5A.

In FIG. 6, the horizontal axis indicates an input value of C'M' data converted by the first color space converter 531, and the vertical axis indicates output values of the C, M, Y, K, LC', and LM' colors to be output, relative to the input value. In this case, input values of the Y' and K' colors are fixed at 100% and 0%, respectively, and input values of the C' and M' colors are those indicated on the horizontal axis. Specifically, for example, actual input values of the C', M', Y', and K' colors corresponding to 20% on the horizontal axis are 20%, 20%, 100%, and 0%, respectively.

As shown in FIG. 6, there are regions where the values of the LC', LM', C, and M colors change rapidly near 50% where the input values of the C' and M' colors are relatively large. Specifically, in a region D in FIG. 6, the values of the LC' and LM' colors change from an increasing state to a rapidly decreasing state, and in a region E, the values of the C and M colors rapidly increase.

In this case, an output value suddenly changes in response to a slight change in an input value. Thus, when an image is formed in the image forming section 10, tone jump may tend to occur in the image.

In order to suppress the occurrence of this phenomenon, for example, the LC' and LM' colors may conceivably be set to reduced values on the basis of first UCR rates. In this case, however, there may be another problem in that the graininess of the image formed in the image forming section 10 may deteriorate in an area of the image where the concentration is low. Specifically, in the area of the image where the concentration is low, the LC and LM colors are used by a large amount, as shown in FIG. 6. Therefore, if the LC' and LM' colors are conceivably set to reduced values, the graininess of the image may readily deteriorate.

In this exemplary embodiment, a second non-basic-color limit rate (second UCR rate) set relative to the total input value of the basic colors and indicating a rate that limits the use of the non-basic colors relative to the maximum non-basic-color values is newly set. Each non-basic-color value is determined on the basis of the first UCR rate and the second UCR rate.

Figure 7:
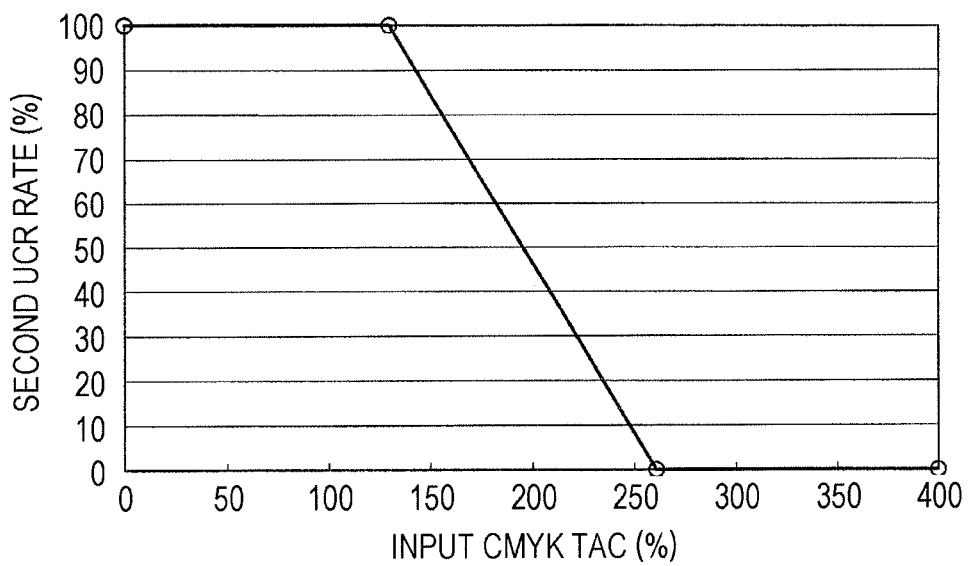
FIG. 7 illustrates a second UCR rate.

FIG. 7 illustrates the second UCR rate.

In FIG. 7, the horizontal axis indicates a total input value of C'M'Y'K' data converted by the first color space converter 531. Specifically, the total input value is the total of the values of the C', M', Y', and K' colors expressed by C'+M'+Y'+K'. The vertical axis indicates the second UCR rate, which is a rate that limits the use of the non-basic colors. In other words, the vertical axis indicates a rate that limits the use of the LM color and the LC color relative to the maximum non-basic-color values for these colors.

As shown in FIG. 7, in this example, the second UCR rate is set at 100% when the total input value of the C'M'Y'K' data ranges from 0% to 140%. The second UCR rate is set at 0% when the total input value is 260%, and these two points are connected by a straight line.

The reason the second UCR rate is set at 100% when the total input value ranges from 0% to 140% is that this value, i.e., the second UCR rate=100%, corresponds to an upper limit value at which the aforementioned tone jump does not occur in the image formed by the image forming section 10. Specifically, when the total input value exceeds 140%, the aforementioned tone jump may tend to occur in the image if the LM and LC colors are not limited by the second UCR rate. Furthermore, by setting the second UCR rate at 100% when the total input value of the C'M'Y'K' data ranges from 0% to 140%, the LM and LC colors are used by a large amount so that the graininess of the image is improved. Therefore, the second UCR rate may be set at 100% when the total input value ranges from 100% to a predetermined value. When the total input value is smaller than or equal to 100%, the second UCR rate should be set at 100% so as not to affect the first UCR rates. Specifically, the second UCR rate is set so as to limit the use of each non-basic color when the total input value of the basic colors exceeds the maximum input value (100%) of the non-basic color. On the other hand, the second UCR rate is set so as not to limit the use of each non-basic color when the total input value of the basic colors exceeds the maximum input value (100%) of the non-basic color.

The second UCR rate is set at 0% when the total input value is 260% since a total-amount limit value for C'M'Y'K' is 260%. Specifically, the second UCR rate is set at 0% when the total input value of the basic colors is larger than or equal to the total-amount limit value.

The setting of the second UCR rate is not limited to the above. For example, the second UCR rate may be set at 100% when the total input value of the C'M'Y'K data ranges from 0% to 140% and may be set at 0% when the total input value is 260%, as in FIG. 7, and these two points may be connected by a curve line.

By incorporating the second UCR rate in the above-described manner, the output values of the LC and LM colors may be suppressed in a range in which the total input value of C'M'Y'K' is large, that is, an area where the concentration of the image is high. As a result, the occurrence of the regions in FIG. 6 where the values of LC', LM', C and M colors rapidly change may be reduced. Furthermore, in areas where the concentration of the image is high, problems in the graininess of the image formed by the image forming section 10 are less likely to occur. Therefore, even if the input values of the LC and LM colors are suppressed, there is no problem with respect to the graininess of the image. On the other hand, in a range in which the total input value of C'M'Y'K' is small, the output values of the LC and LM colors are not limited by the second UCR rate, but are limited by the first UCR rates. Therefore, there is not much difference in the output values of the LC and LM colors between when the second UCR rate is provided and when the second UCR rate is not provided, thereby preventing deterioration of the graininess of the image formed by the image forming section 10 even when the second UCR rate is provided.

Figure 8:
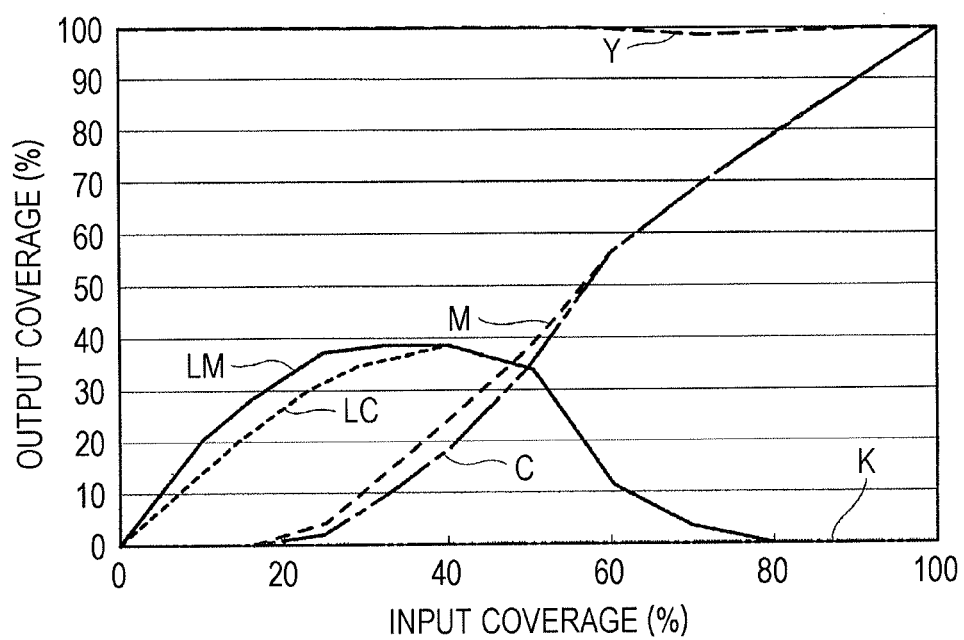
FIG. 8 illustrates a case where non-basic-color values and basic-color values are determined by using the second UCR rate set as in FIG. 7.

FIG. 8 illustrates a case where non-basic-color values and basic-color values are determined by using the second UCR rate set as in FIG. 7.

FIG. 8 differs from FIG. 6 in that the values are determined by using not only the first UCR rates but also the second UCR rate. Similar to FIG. 6, the horizontal axis indicates an input value of C'M' data converted by the first color space converter 531, and the vertical axis indicates output values of the C, M, Y, K, LC', and LM' colors to be output, relative to the input value. In this case, input values of the Y' and K' colors are fixed at 100% and 0%, respectively, and input values of the C' and M' colors are those indicated on the horizontal axis.

As shown in FIG. 8, regions where the output values rapidly change are eliminated, such that each of the output values entirely form a smooth curve line. Therefore, since the output values do not rapidly change in response to a change in the input values, tone jump is less likely to occur in the image forming section 10.

Next, a method for determining final LC and LM values by using the second UCR rate will be described.

Assuming that this second UCR rate is denoted by $\beta$, the second UCR rate is determined by using a function h indicated in the following expression (5):

$$\beta = h(C'+M'+Y'+K') \tag{5}$$

In the non-basic-color value determiner 533, expression (1) is calculated while the ratio between the LC color and the LM color is fixed (namely, the ratio between LC' and LM' is fixed), under the condition in which the calculated value is smaller than or equal to a total value (i.e., total colorant amount TAC=C+M+Y+K+LC+LM) of the values of the colors set for the image forming section 10. The maximum values for the LC color and the LM color (maxLC$_2$ and maxLM$_2$) in which calculated values of CMY exist are determined within the range of the preset color difference. Although the maximum values for the LC color and the LM colors are determined while the ratio between the LC color and the LM color is fixed so as to shorten the calculation time in this exemplary embodiment, the maximum values for the LC color and the LM color in which the calculated values of CMY exist may be determined for each combination of the LC color and the LM color, and a combination in which the sum of the LC color and the LM color is at maximum may be set as a maximum value.

Then, the final LC and LM values are determined from the following expression (6):

$$LC = \max LC_2 \cdot \beta$$

$$LM = \max LM_2 \cdot \beta \tag{6}$$

Operation of Color Conversion Processor 53

Next, a series of steps performed in the color conversion processor 53 will be collectively described.

FIG. 9 is a flowchart illustrating the operation of the color conversion processor 53.

First, in step S101, the first color space converter 531 converts C"M"Y"K" data output from the rasterizer 52 into C'M'Y'K' data dependent on the color space in the image forming section 10.

In step S102, the second color space converter 532 further converts the C'M'Y'K' data into L*a*b* data.

In step S103, the non-basic-color value determiner 533 determines maximum non-basic-color values maxLC and max LM for the LC color and the LM color within an allowable color-value range and under the limitation of the total colorant amount TAC.

In step S104, the non-basic-color value determiner 533 determines first UCR rates ($\alpha C$ and $\alpha M$) corresponding to input values of C' and M' by using the functions $g_C$ and $g_M$ indicated in expression (3).

In step S105, the non-basic-color value determiner 533 determines a second UCR rate $\beta$ corresponding to the total input value of C'M'Y'K' (C'+M'+Y'+K') by using expression (5).

In step S106, LC' and LM' values are determined as provisional values of the LC color and the LM colors by using expression (4).

In step S107, the maximum values maxLC$_2$ and maxLM$_2$ for the LC color and the LM color are determined by using the LC' and LM' values.

In step S108, final LC and LM values are determined from expression (6) by using maxLC$_2$, maxLM$_2$, and the second UCR rate $\beta$.

In step S109, the basic-color value determiner 534 determines values of the C, M, and Y colors from expression (2) by using the LC and LM values, the L*, a* and b* values, and the K value. Consequently, the values of the C, M, Y, K, LC, and LM colors are all determined.

With the above method, the four colors, i.e., C'M'Y'K', can be separated into six colors, i.e., CMYKLCLM. When image formation is performed in the image forming section 10 by using this output image signal, the occurrence of tone jump may be further reduced. Moreover, the graininess of the image formed in the image forming section 10 may be improved.

Although the non-basic colors used that are different from the C, M, Y, and K colors, which are the basic colors, are the LC and LM colors in the above-described example, the non-basic colors are not limited to these colors. For example, the non-basic colors may alternatively be an orange (O) color, a green (G) color, and a violet (V) color. Furthermore, the colorants of the non-basic colors are not limited so long as they are of certain colors. Specifically, the exemplary embodiment is applicable to a case where an image is formed by using the basic colors in addition to one or more non-basic colors.

However, this exemplary embodiment is effective especially in a case where the non-basic colors are light colors with lower concentration than the basic colors. In other words, in this exemplary embodiment, the light cyan (LC) color, which is a lighter color than the cyan (C) color, and the light magenta (LM) color, which is a lighter color than the magenta (M) color, are used as the non-basic colors. In this case, since the phenomenon described above with reference to FIG. 6 tends to occur, the problem of tone jump tends to occur in the image forming section 10.

Furthermore, although the above description of this exemplary embodiment is directed to the electrophotographic image forming apparatus 1, the exemplary embodiment may alternatively be applied to, for example, an inkjet-type image forming apparatus. In that case, the colorants to be used in the image forming apparatus are inks.

Furthermore, the above-described color conversion processing performed in the non-basic-color value determiner 533 and the basic-color value determiner 534 is actually performed by, for example, generating a look-up table (LUT), which is a multidimensional table having the functions of the non-basic-color value determiner 533 and the basic-color value determiner 534. In this case, the LUT is a four-input six-output LUT.

The processing performed by the color conversion processor 53 in this exemplary embodiment is achieved by, for example, software and hardware resources working in cooperation with each other. Specifically, a central processing unit (CPU) (not shown) within a control computer provided in the controller 50 loads a program, which achieves each function of the color conversion processor 53, into a memory (not shown) and executes the program so that the processing is performed.

Accordingly, the processing performed by the color conversion processor 53 may also be regarded as a program that has a non-basic-color value determining function and a basic-color value determining function and that causes a computer to execute a process including determining a value of a non-basic color that is different from a basic color on the basis of a maximum non-basic-color value, a first non-basic-color limit rate, and a second non-basic-color limit rate, the value of the non-basic color being determined so as to be used in the image forming section 10 that forms an image by using a colorant of the basic color and a colorant of the non-basic color, the maximum non-basic-color value being a maximum value for the non-basic color that can be used relative to an input value of the basic color in an input image signal having the basic color as an element, the first non-basic-color limit rate being set relative to the input value of the basic color and indicating a rate that limits the use of the non-basic color relative to the maximum non-basic-color value, the second non-basic-color limit rate being set relative to a total input value of the basic color and indicating a rate that limits the use of the non-basic color relative to the maximum non-basic-color value; determining a value of the basic color to be used in the image forming section 10 on the basis of the determined value of the non-basic color; and converting the input image signal having the basic color as the element into an output image signal having the basic color and the non-basic color as elements by using the non-basic-color value determining function and the basic-color value determining function.

The program that achieves the exemplary embodiment may be provided via a communication unit, or may be provided by being stored in a storage medium, such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion device comprising:
a non-basic-color value determiner that determines a value of a non-basic color that is different from a corresponding basic color of a plurality of basic colors on the basis of a maximum non-basic-color value, a first non-basic-color limit rate, and a second non-basic-color limit rate of the non-basic color, the value of the non-basic color being determined so as to be used in an image forming unit that forms an image by using a colorants of the basic colors and a colorant of the non-basic color,
the maximum non-basic-color value being a maximum value for the non-basic color that can be used relative to an input value of the corresponding basic color in an input image signal having the corresponding basic color as an element,
the first non-basic-color limit rate being set relative to the input value of the basic color that corresponds to the non-basic color and indicating a rate that limits the use of the non-basic color relative to the maximum non-basic-color value,
the second non-basic-color limit rate being set relative to a total input value of the plurality of basic colors and indicating a rate that limits the use of the non-basic color relative to the maximum non-basic-color value; and
a basic-color value determiner that determines a value of each of the plurality of basic colors to be used in the image forming unit on the basis of the value of the non-basic color determined by the non-basic-color value determiner,
wherein the input image signal having the plurality of basic colors as elements is converted into an output image signal having the non-basic color and the plurality of basic colors as elements by using the values determined by the non-basic-color value determiner and the basic-color value determiner.

2. The color conversion device according to claim 1, wherein the second non-basic-color limit rate is set so as not to limit the use of the non-basic color when the total input value of the corresponding basic color is smaller than or equal to a maximum input value of the non-basic color.

3. The color conversion device according to claim 1, wherein the second non-basic-color limit rate is set at 0% when the total input value of the corresponding basic color is larger than or equal to a total-amount limit value.

4. The color conversion device according to claim 2, wherein the second non-basic-color limit rate is set at 0% when the total input value of the corresponding basic color is larger than or equal to a total-amount limit value.

5. The color conversion device according to claim 1, wherein the non-basic color is a light color with lower concentration than the corresponding basic color.

6. The color conversion device according to claim 5, wherein the non-basic color has the same color phase as the corresponding basic color.

7. An image forming apparatus comprising:
an image forming unit that forms an image by using colorants of a plurality of basic colors and a colorant of a non-basic color that is different from the corresponding basic color of the plurality of basic colors;
a non-basic-color value determiner that determines a value of the non-basic color to be used in the image forming unit on the basis of a maximum non-basic-color value, a first non-basic-color limit rate, and a second non-basic-color limit rate of the non-basic color,
the maximum non-basic-color value being a maximum value for the non-basic color that can be used relative to an input value of the corresponding basic color in an input image signal having the corresponding basic color as an element,
the first non-basic-color limit rate being set relative to the input value of the corresponding basic color and indicating a rate that limits the use of the non-basic color relative to the maximum non-basic-color value,
the second non-basic-color limit rate being set relative to a total input value of the plurality of basic colors and indicating a rate that limits the use of the non-basic color relative to the maximum non-basic-color value; and
a basic-color value determiner that determines a value of each of the plurality of basic colors to be used in the image forming unit on the basis of the value of the non-basic color determined by the non-basic-color value determiner,
wherein the input image signal having the plurality of basic colors as elements is converted into an output image signal having the non-basic color and the plurality of basic colors as elements by using the values determined by the non-basic-color value determiner and the basic-color value determiner.

8. The image forming apparatus according to claim 7, wherein the non-basic color is a light color with lower concentration than the corresponding basic color, and wherein the second non-basic-color limit rate is set so as to limit the use of the non-basic color when the total input value of the plurality of basic colors exceeds a maximum input value of the non-basic color.

9. A non-transitory computer readable medium storing a program causing a computer to execute a process, the process comprising:
determining a value of a non-basic color that is different from a corresponding basic color of a plurality of basic colors on the basis of a maximum non-basic-color value, a first non-basic-color limit rate, and a second non-basic-color limit rate of the non-basic color, the value of the non-basic color being determined so as to be used in an image forming unit that forms an image by using colorants of the plurality of basic colors and a colorant of the non-basic color,
the maximum non-basic-color value being a maximum value for the non-basic color that can be used relative to an input value of the corresponding basic color in an input image signal having the corresponding basic color as an element,
the first non-basic-color limit rate being set relative to the input value of the corresponding basic color and indicating a rate that limits the use of the non-basic color relative to the maximum non-basic-color value,
the second non-basic-color limit rate being set relative to a total input value of the plurality of basic colors and indicating a rate that limits the use of the non-basic color relative to the maximum non-basic-color value;
determining a value of each of the plurality of basic colors to be used in the image forming unit on the basis of the determined value of the non-basic color; and
converting the input image signal having the plurality of basic colors as element into an output image signal having the non-basic color and the plurality of basic colors as elements by using the determined values of the non-basic color and the plurality of basic colors.

10. The color conversion device according to claim 9, wherein the non-basic color is a light color with lower concentration than the corresponding basic color.

11. The color conversion device according to claim 10, wherein the non-basic color has the same color phase as the corresponding basic color.

12. A color conversion method comprising:
determining a value of a non-basic color that is different from a corresponding basic color of a plurality of basic colors on the basis of a maximum non-basic-color value, a first non-basic-color limit rate, and a second non-basic-color limit rate of the non-basic color, the value of the non-basic color being determined so as to be used in an image forming unit that forms an image by using colorants of the plurality of basic colors and a colorant of the non-basic color,
the maximum non-basic-color value being a maximum value for the non-basic color that can be used relative to an input value of the corresponding basic color in an input image signal having the corresponding basic color as an element,
the first non-basic-color limit rate being set relative to the input value of the corresponding basic color and indicating a rate that limits the use of the non-basic color relative to the maximum non-basic-color value,
the second non-basic-color limit rate being set relative to a total input value of the plurality of basic colors and indicating a rate that limits the use of the non-basic color relative to the maximum non-basic-color value;
determining a value of each of the plurality of basic colors to be used in the image forming unit on the basis of the determined value of the non-basic color; and
converting the input image signal having the plurality of basic colors as elements into an output image signal having the non-basic color and the plurality of basic colors as elements by using the determined values of the non-basic color and the plurality of basic colors.

13. The color conversion device according to claim 12, wherein the non-basic color is a light color with lower concentration than the corresponding basic color.

14. The color conversion device according to claim 13, wherein the non-basic color has the same color phase as the corresponding basic color.

* * * * *